United States Patent [19]
Tann

[11] 4,316,145
[45] Feb. 16, 1982

[54] FLUID PRESSURE ACTUATOR WITH PROXIMITY POSITION SENSOR

[75] Inventor: David Tann, Detroit, Mich.

[73] Assignee: Electro-Mechanical Products, Detroit, Mich.

[21] Appl. No.: 924,326

[22] Filed: Jul. 13, 1978

Related U.S. Application Data

[63] Continuation of Ser. No. 728,555, Oct. 1, 1976, abandoned.

[51] Int. Cl.³ .......................... G01B 7/14; H01H 9/00
[52] U.S. Cl. .................................... 324/208; 335/205; 137/553
[58] Field of Search ................ 324/207, 208; 335/205, 335/206, 305; 200/81.9 M; 137/553, 554

[56] References Cited

U.S. PATENT DOCUMENTS

| | | | |
|---|---|---|---|
| 2,892,051 | 6/1959 | Moore | 335/205 |
| 3,022,398 | 2/1962 | Abel | 335/205 |
| 3,205,323 | 9/1965 | Deshautreaux, Jr. | 335/207 |
| 3,305,805 | 2/1967 | Tann | 335/153 |
| 3,414,693 | 12/1968 | Watson et al. | |
| 3,464,044 | 8/1969 | Strauss | 335/305 |
| 3,632,923 | 1/1972 | Paine | 200/81.9 M |
| 3,771,154 | 11/1973 | Takei | 335/205 |

FOREIGN PATENT DOCUMENTS

| | | | |
|---|---|---|---|
| 549422 | 11/1957 | Canada | 335/305 |
| 2011161 | 9/1971 | Fed. Rep. of Germany | 324/34 TK |

*Primary Examiner*—Gerard R. Strecker
*Assistant Examiner*—Walter E. Snow
*Attorney, Agent, or Firm*—Krass, Young & Schivley

[57] ABSTRACT

A fluid pressure actuator is disclosed of the type such as a hydraulic cylinder, having an arrangement for sensing the position of the piston and operating rod assembly at points within the cylinder. The sensing arrangement is disclosed as a magnetically biased reed switch which is installed within the cylinder pressure chamber so as to sense the proximity of the piston or a portion of the attached operating rod. Operating circuitry associated with each proximity switch is also disclosed which provides a delay feature preventing triggering of the associated circuitry upon momentary closing of the reed switch contacts due to mechanical vibrations or other causes.

5 Claims, 3 Drawing Figures

FLUID PRESSURE ACTUATOR WITH PROXIMITY POSITION SENSOR

This is a continuation of application Ser. No. 728,555, filed Oct. 1, 1976, now abandoned.

BACKGROUND OF THE INVENTION

1. Field of the Invention

This invention concerns fluid pressure actuator mechanisms and more particularly such mechanisms which have a position sensing capability associated with the output member.

2. Description of the Prior Art

It is often desirable or necessary in applications of fluid pressure actuators such as hydraulic cylinders to have some means for generating a signal indicative of the relative position of the output member associated therewith for purposes of control of systems into which the actuators are integrated. This is particularly so in automated manufacturing systems such as are utilized in automotive manufacturing operations. The traditional approach at providing this capability has been the utilization of switches mechanically actuated by the output member, usually with the use of associated cam or lever arm assemblies mechanically activated by stroking of the output rod. However, in many applications such as the highly automated automotive manufacturing operations referred to, extreme requirements of reliability and long life are necessary, since such equipment is normally operated for many thousands of hours and with minimal maintenance. The situation is further intensified by the great penalty involved in any down time of the equipment which could result from simple failure of the device or from the resulting damage to the remaining portions of the equipment due to failure of the actuator to operate properly.

In this context, mechanical actuation of limit switches which have been mounted in relatively exposed conditions have created great problems since the environment in such applications often times include oil and coolant splash or impacting of the mechanism by virtue of its exposed position. The presence of moving parts also introduces the element of mechanical wear and other factors all of which have produced a less than satisfactory performance of such arrangements.

A previous attempt to provide such position indication by sensing the position of an internal portion of the movable actuator member has similary included a switch which is operated by a movable member engaged with some portion of the movable output member within the interior of the actuator device. Since mechanical movement is still involved, the aforementioned problems are not solved by this approach and additional problems of proper sealing of the element extending into the interior of the device are created. These factors have created a generally unacceptable performance history of such devices.

Another problem encountered in such devices is false triggering of the switch caused by a momentary closing or opening of the switching device resulting from shock or vibrational impacts of the switch.

It is therefore an object of the present invention to provide a position sensing arrangement for fluid actuator devices which does not involve the use of a mechanical actuation of a switching device and is mounted in an internal installation sensing the position of a movable member within the confines of the actuator device housing.

It is another object of the present invention to provide an arrangement for obviated false triggering caused by momentary closings or openings of the switch assembly.

SUMMARY OF THE INVENTION

These and other objects which will become apparent upon a reading of the following specification and claims are accomplished by means of an arrangement wherein a proximity sensor including magnetically biased reed switch is utilized to sense the position of the piston and actuating rod assembly at a point within the confines of the actuator housing, the installation being such as to resist high pressures. The operating circuitry associated with each proximity sensor includes a capacitance delay feature which prevents triggering of a trigger circuit included therein upon momentary closing or opening of the reed switch contacts.

In the detailed description and the following specification a particular embodiment will be described and the specific terminology will be utilized for the sake of clarity and in accordance with the requirements of 35 USC 112, but it is to be understood that many variations are possible within the concept of the present invention and the same is not to be construed in a limiting sense.

Figure 1:
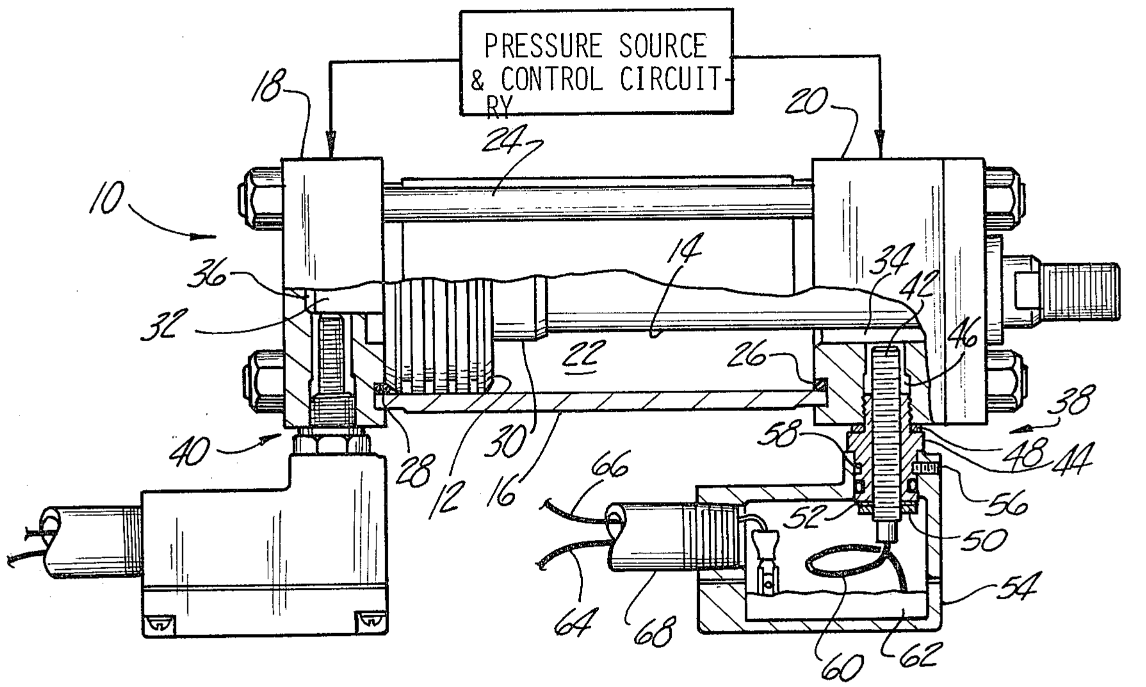
FIG. 1 is a partially sectional view of an hydraulic cylinder having incorporated therein a position sensor arrangement according to the present invention.

Referring then to the drawings and particularly FIG. 1, a fluid pressure actuator device is depicted in partial section, comprising an hydraulic cylinder 10 including a movable actuating member consisting of an assembly of a piston 12 secured to an operating rod 14, disposed in an actuator housing comprised of a cylinder 16 which together with a pair of end caps 18 and 20 forms a fluid pressure chamber designated as 22 in FIG. 1. Such a pressure source and control circuitry means as shown in the block in FIG. 1 are provided to selectively pressurize the fluid pressure chamber 22 to cause the movable actuator member to move therein in which movement piston 12 is reciprocated to perform the actuation function. End caps 18 and 20 are retained in a sealing relationship with sleeve 16 by means of bolts 24 with packings 26 and 28 provided to seal the fluid pressure chamber 22 in the conventional manner.

Cushioning plugs of conventional design are also provided to reduce the deceleration rate of the piston 12 and operating rod 14 assembly at either end of its stroke. The first cushioning plug 30 is formed by an increased diameter section on the operating rod 14 which may be provided either by an integral increased O.D. of the operating rod 14 itself, or by a sleeve fixed thereon, while cushioning plug 32, adapted to cushion the return stoke, takes the form of an end plug affixed to the rear portion of the piston 12. Cushion plug 30 is adapted to be received in an end chamber 34 formed in the end cap 20 with a fluid bypass passage means (not shown) provided to bleed fluid trapped in the chamber 34 by a cushion plug 30 to a low pressure region. A similar arrangement is provided for a chamber 36 formed in end cap 18 to similarly cushion the return movement of the piston 12. Passage means is also of course provided in order to pressurize the space on either side of piston 12 in order to actuate and return the assembly of the piston 12 and operating rod 14 assembly. Since all of these details are conventional the details of the same are not here described.

The arrangement according to the present invention includes proximity sensor means including proximity sensor assemblies 38 and 40 each adapted to generate a signal upon movement of the movable actuator into respectively the forward position and the return position of the movable actuator member comprised of the piston 12 and the actuator rod 14.

The proximity sensor assembly 38 is shown in partial section in FIG. 1 and is typical of both proximity sensor assemblies 38 and 40. The assembly 38 includes a sensor plug 42 threaded into a nut member 44 which is in turn threaded into a bore 46 fromed in end cap 20, nut member 44 being firmly seated on a copper sealing gasket 48 providing a sealing means therebetween. The axial position of the sensor plug 42 is adjustable by threading the same in and out of the nut member 44 to provide the correct clearance between the cushioning plug 30 and the interior end of sensor plug 42, as the cushion plug 30 advances into the space 34 into juxtaposition with respect to the proximity sensor assembly 38.

Upon setting of the proper clearance by threading of the sensor plug 42 in or out of the nut member 44, a locking nut 50 of the type including a nylon sealing ring 52 is threaded onto the rear portion of sensor plug 42 and tightened securely onto the rear radial face of the nut member 44 providing a high pressure sealing means between the sensor plug 42, locking nut 50 and nut member 44 and a positive locking together of these elements to secure the axial position of the sensor plug 42. Nut member 44 is in turn affixed to a junction housing 54 by means of set screws 56 carried by the junction housing 54 and advanced into an opening 58 formed in the bore in the junction housing 54 receiving the rear portion of the nut member 44. Electrical leads 60 from the magnetically biased reed proximity switch contained within the sensor plug 42 (to be described in detail hereinafter) are connected to operating circuitry 62 (also to be hereinafter described) potted into the interior of the junction housing 54 with external leads 64 and 66 passing through a conduit 68 threaded into the junction housing 54 as shown in FIG. 1.

Figure 2:
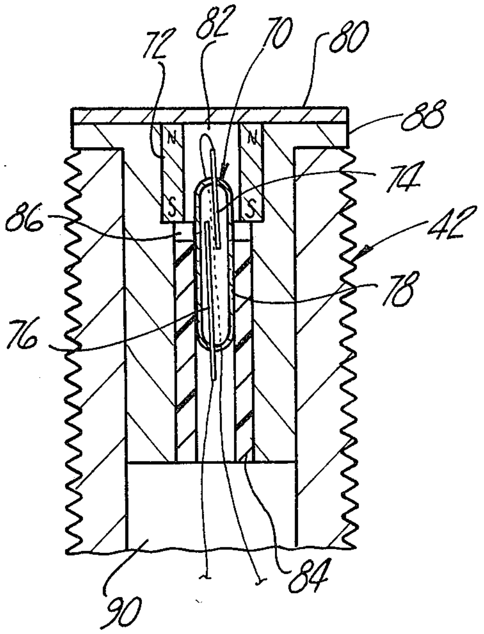
FIG. 2 is an enlarged sectional view of a portion of the proximity sensor incorporated in the device depicted in FIG. 1.

Referring to FIG. 2, the details of the magnetically biased reed proximity switch is depicted which includes a portion of sensor plug 42. This type of switch is described in considerable detail in U.S. Pat. No. 3,305,805 and a complete discussion of the characteristics and design features of such switches is not here included for that reason.

In the present invention the magnetically biased reed switch assembly configuration and the installation of said reed assembly takes a special form in order that it may reliably resist the sometimes high pressure exerted thereon by virtue of its position extending into the fluid pressure chamber 22 so as to be subjected to the operating pressures. Specifically the reed switch assembly 70 is disposed within a tubular magnet 72 having a polar orientation along the axis of the tube as indicated in FIG. 2. The reed switch assembly 70 itself has an asymmetrical configuration, that is the reeds 74 and 76 do not cross in the center of the envelope 78 as distinguished from the configurations described in the above cited patent, but rather this crossing point is offset toward the tubular magnet 74. This difference in configuration is adopted in the present design since the axial movement of the reed assembly 70 for purposes of setting the proper bias and mode of operation of the reed assembly 70 is limited by the presence of a sealing diaphragm 80 extending across one end of the tubular magnet 72, rendering the interior space within the magnet 72 a blind hole 82. The asymmetric configuration thereof allows setting of the proper bias and mode with a more limited axial movement relative to the tubular magnet 72 and the reed switch assembly 70. The reed switch assembly 70 is disposed within a plastic tube 84 which is adjusted axially in the bore 86 formed in a flanged bushing 88 in order to get the proper biasing and switching mode, at which point it is securely cemented to the interior of bore 86. The entire assembly is then inserted into the bore 90 formed in the end portion of the sensor plug 42 with the flanged portion of the flanged bushing 88 seated on the end portion of the sensor plug. A high pressure and oil resistant adhesive is then used to fix the flanged bushing 88 within the bore 90. The sensor plug 42 is then assembled into the end cap 20 as previously described.

In operation upon approach of the positioning plug 30 into the space 34 and into juxtaposition opposite the sensor plug 42, the influence of the ferrous mass comprising the cushioning plug 30 affects the magnetic flux in such a manner that the reed 74 and 76 are either brought into contact or out of contact depending on the modal characteristic as set by the adjustment described above, as described in detail in the aforementioned patent.

It can be seen that the internal sensing is carried out without any mechanical movement or necessitating the use of dynamic seals, etc., and the sealing arrangement is such as to be very effective; i.e., the diaphragm 80 and the flanged bushing 88 are forced into tighter contact and into tighter contact with the end portion sensor plug 42 by the pressure exerted in the fluid pressure chamber 22, while the threaded connections are sealed by very reliable high pressure copper gasket 48 and nylon sealing ring 52. Furthermore, no physical contact is involved inasmuch as the cushioning plug 30 and the sensor plug 42 do not touch but rather there is a purely proximity sensing therebetween such that no mechanical wear is possible. A similar function is carried out in the return position of the piston 12 and rod assembly 14 by sensing of the rear plug 32 in a similar manner. Alternatively, if cushioning plugs are not utilized the sensor plug 42 could be disposed in the respective end caps in an axial direction so that as the piston 12 is seated on an abutment surface formed by the end cap 20 the sensor would then sense the piston 12 itself. It should also be noted that the particular construction of the tubular magnet 72 and the reed switch assembly 70 allows for very small diameter assembly; i.e., on the order of a $\frac{3}{8}$ inch O.D., the size of the opening in the end cap 20 being of considerable significance in establishing reliability and life of the assembly since the total force generated on the assembly is of course related to the cross sectional area exposed to the pressure within the chamber 22.

Figure 3:
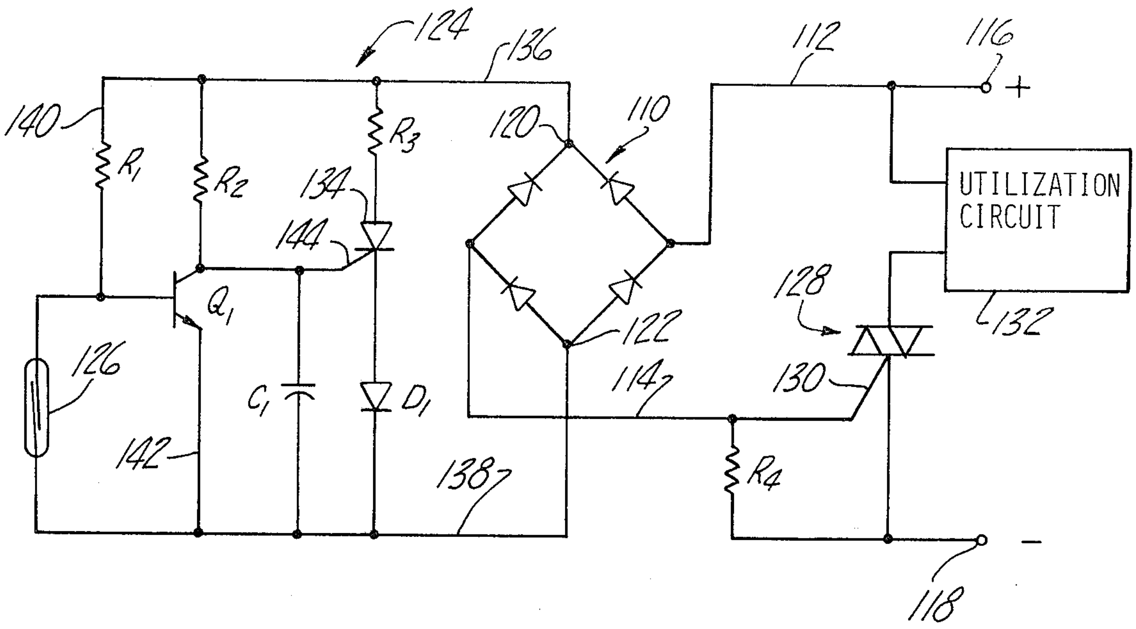
FIG. 3 is a schematic diagram of operating circuitry associated with each proximity sensor incorporated in the device shown in FIG. 1.

Referring to FIG. 3, the operating circuitry associated with each respective proximity switch is depicted in schematic form. As described above, this circuitry is designed to provide a low voltage at the proximity switch reed contact to prolong the life of the switch and also prevents triggering of the circuitry activated by momentary closing of the switch so as to prevent false signals created by vibration or shock induced momentary contacting of the reed contacts. The circuitry utilizes a full wave rectifier diode circuit 110 which has one side thereof connected via leads 112 and 114 to input terminals 116 and 118 receiving the input power source (120 volt AC). The diode circuit 110 produces a full wave rectified DC voltage at connections 120 and 122. This full wave rectified DC voltage is utilized in the trigger circuit 124 utilized in conjunction with each of the proximity sensor switches 126. Trigger circuit 124 upon becoming conductive relative to terminals 120 and 122 as hereinafter will be described activates a Triac 128 via a connection to lead 114 to its gate 130, with Triac 128 upon being pulled in delivering a heavy current to a utilization circuit 132 such as a relay incorporated in a control circuit, etc.

The conductivity of trigger circuit 124 is controlled by an SCR 134 connected in series with a current limiting resistor $R_3$ and a diode $D_1$ across leads 136 and 138 connected respectively to terminals 120 and 122 of the diode circuit 110. As long as switch 126 is open as shown in FIG. 4, the base of an NPN transistor has a voltage applied thereacross via lead 140 and lead 142. This impressed voltage renders the collector-emitter of $Q_1$ conductive so that the gate 144 of SCR 134 is grounded out to produce non-conductance thereof. Upon closing of switch 126 the potential at the base of $Q_1$ goes to zero and shuts off $Q_1$ so that a voltage is now impressed across a capacitor $C_1$ which has characteristics such that it becomes charged within a time period on the order of two milliseconds. Upon becoming charged capacitor $C_1$ causes a voltage to be applied to the SCR gate 144, triggering and latching the same so as to create a conductance between terminals 120 and 122 to thereby fire the Triac 128.

A resistance $R_2$ is included such that the current flow when $Q_1$ is turned on is negligible; i.e., on the order of 56 K ohms so that the Triac 128 is not fired thereby. $R_1$ is similarly a relatively high resistance (150 K) such that the voltage at the contacts of switch 126 is very low; i.e., on the order of 0.7 volts.

The diode $D_1$ is included to ensure that the $V_{CE(SAT)}$ of $Q_1$ will not interfere with turn off of the SCR 134. Upon reopening of the switch 126 voltage is again applied to the base of $Q_1$ turning it on causing discharge of capacitor $C_1$ and connection of the gate 144 of SCR 134 to ground to thereby again render the trigger circuit 124 nonconductive. It can thus be appreciated that this circuitry provides a very low voltage at the switch 126 and also protects against false indications caused by momentary contacts of the reeds of switch 126.

It will, of course, be understood that the switch 126 may be biased in the normally closed mode, such that the postion control signal would be generated by the absence of current in the trigger circuit 124.

The embodiments of the invention in which an exclusive property or privilege is claimed are defined as follows:

1. A fluid pressure actuator including:

a fluid pressure cylinder;

a movable piston member slidably disposed in said cylinder;

a pair of end caps, one each mounted to said cylinder to cover either end of said cylinder to define a fluid pressure chamber in said cylinder, with said piston moving into abutment with either end cap during movement in said cylinder;

a piston rod mounted to said piston to form a piston and rod assembly and extending through said cylinder and a bore formed in one of said end caps;

at least one cushioning plug adjacent said piston and forming a part of said piston or said piston rod, said cushioning plug forming a localized change in diameter portion of said piston and rod assembly immediately adjacent said piston;

at least one axially extending cushioning plug chamber formed in at least one of said end caps positioned and configured to receive said at least one cushioning plug as said piston approaches said end cap;

means for pressurizing said fluid pressure chamber so as to cause said piston member to be reciprocated in said fluid pressure chamber;

at least one opening formed in said at least one end cap extending laterally into said at least one cushioning chamber;

electrical proximity sensor means sensing the position of said cushioning plug within said fluid pressure chamber at at least one position in said movement, said proximity sensor means including a threaded proximity sensor plug adjustably mounted in said opening for selective movement toward and away from said one cushioning chamber and extending into said one cushioning chamber, said proximity sensor means generating a signal by movement of said cushioning plug into said at least one cushioning chamber;

circuit means associated with said electrical proximity sensor so as to generate said signal generated upon movement of said cushioning plug into said at least one cushioning chamber;

a nut member threadedly receiving said threaded sensor plug and releasably securing said threaded sensor plug against movement relative to said one cushioning chamber;

a junction housing disposed along side said at least one end cap mounted on said nut member with said sensor plug extending into said junction housing interior;

further including electrical leads secured to said proximity sensor extending through said threaded plug into said junction housing and wherein said circuit means is contained within said junction housing electrically connected to said proximity sensor means by said electrical leads.

2. The fluid pressure actuator of claim 1 wherein said cushioning plug is formed by an increased diameter section of said rod and said threaded sensor plug is provided with a thread form thereon extending to one end thereof adjacent said one cushioning chamber.

3. A fluid pressure actuator including: a fluid pressure chamber; a movable actuator member disposed in said chamber; means for pressurizing said fluid pressure chamber so as to cause said movable member to move in said fluid pressure chamber; proximity sensor means sensing the position of said movable member within said fluid pressure chamber at at least one position in said movement, said proximity sensor means including a proximity sensor extending into said fluid pressure chamber and generating a signal upon movement of said movable actuator member into said at least one position, said proximity sensor means including magnetically biased reed switch means including a reed switch assembly and a tubular magnet having axially oriented poles and means mounting said reed switch assembly extending into said tubular magnet, said magnetically biased reed switch assembly including a threaded sensor plug having one end extending into said fluid chamber exposed to fluid pressure therein, and a bushing having a flange at one end thereof mounted in said end of said sensor plug, said flange overlying the face of the end of said sensor plug extending into said fluid chamber and being of substantially the same diameter; wherein said tubular magnet is carried by said bushing disposed in a counterbore extending in from said flanged end of said bushing a distance to position the end of said tubular magnet flush with the outer face of said flange; said magnetically biased reed switch assembly further including a diaphragm extending across said flange of said flanged bushing and covering said counterbore and tubular magnet; said movable actuator member including a ferrous mass moving into juxtaposition with said magnetically biased reed switch means at said at least one position of said movable actuator member; said movable member comprising a piston and rod assembly, said rod having an increased diameter section formed thereon, and wherein said proximity sensor senses movement of said increased diameter section into juxtaposition with said proximity sensor, said threaded sensor plug being screwably shiftable in a direction along the longitudinal axis thereof toward and away from said increased diameter section of said rod to allow adjustment of the spacing between said proximity sensor and said increased diameter section.

4. A fluid pressure actuator including: a fluid pressure chamber; a movable actuator member disposed in said chamber; means for pressurizing said fluid pressure chamber so as to cause said movable member to move in said fluid pressure chamber; proximity sensor means sensing the position of said movable member within said fluid pressure chamber at at least one position in said movement, said proximity sensor means including a proximity sensor extending into said fluid pressure chamber and generating a signal upon movement of said movable actuator member into said at least one position, said proximity sensor means including magnetically biased reed switch means including a reed switch assembly and a tubular magnet having axially oriented poles and means mounting said reed switch assembly extending into said tubular magnet, said magnetically biased reed switch assembly including a threaded sensor plug having one end extending into said fluid chamber exposed to fluid pressure therein, and a bushing having a flange at one end thereof mounted in said end of said sensor plug, said flange overlying the face of the end of said sensor plug extending into said fluid chamber and being of substantially the same diameter; wherein said tubular magnet is carried by said bushing disposed in a counterbore formed extending in from said flanged end of said bushing a distance to position the end of said tubular magnet flush with the outer face of said flange; said magnetically biased reed switch assembly further including a diaphragm extending across said flange of said flanged bushing and covering said counterbore and tubular magnet; said movable actuator member including a ferrous mass moving into juxtaposition with said magnetically biased reed switch means at said at least one position of said movable actuator member; circuit means associated with said reed switch so as to generate said signal upon movement of said movable actuator member into said at least one position, said fluid pressure actuator further including a nut member threadedly receiving said threaded sensor plug, said threaded sensor plug being shiftable along the longitudinal axis thereof toward and away from said fluid chamber to permit adjustment of the spacing between said proximity sensor and said movable member, said nut member normally releasably holding said sensor plug against movement thereof; a junction housing mounted on said nut member; and, further including electrical leads secured to said reed switch assembly extending through said threaded plug into said junction housing wherein said circuit means is contained within said junction housing electrically connected to said proximity sensor means by said electrical leads.

5. A fluid pressure actuator including: a fluid pressure chamber; a movable actuator member disposed in said chamber; means for pressurizing said fluid pressure chamber so as to cause said movable member to move in said fluid pressure chamber; proximity sensor means sensing the position of said movable member within said fluid pressure chamber at at least one position in said movement, said proximity sensor means including a proximity sensor extending into said fluid pressure chamber and generating a signal upon movement of said movable actuator member into said at least one position, said proximity sensor means including magnetically biased reed switch means including a reed switch assembly and a tubular magnet having axially oriented poles and means mounting said reed switch assembly extending into said tubular magnet, said magnetically biased reed switch assembly including a threaded sensor plug having one end extending into said fluid chamber exposed to fluid pressure therein, and a bushing having a flange at one end thereof mounted in said end of said sensor plug, said flange overlying the face of the end of said sensor plug extending into said fluid chamber and being substantially the same diameter; wherein said tubular magnet is carried by said bushing disposed in a counterbore formed extending in from said flanged end of said bushing a distance to position the end of said tubular magnet flush with the outer face of said flange; said magnetically biased reed switch assembly further including a diaphragm extending across said flange of said flanged bushing and covering said counterbore and tubular magnet; said movable actuator member including a ferrous mass moving into juxtaposition with said magnetically biased reed switch means at said at least one position of said movable actuator member; said reed switch assembly including a pair of crossing reeds, one of the reeds of said pair thereof being disposed adjacent said tubular magnet and being shorter in length than the other of said reeds in said pair thereof.

* * * * *